United States Patent
Klett et al.

(10) Patent No.: US 7,456,131 B2
(45) Date of Patent: Nov. 25, 2008

(54) INCREASED THERMAL CONDUCTIVITY MONOLITHIC ZEOLITE STRUCTURES

(75) Inventors: James Klett, Knoxville, TN (US); Lynn Klett, Knoxville, TN (US); Jonathan Kaufman, Leonardtown, MD (US)

(73) Assignee: UT-Battelle, LLC, Oak Ridge, TN (US)

( * ) Notice: Subject to any disclaimer, the term of this patent is extended or adjusted under 35 U.S.C. 154(b) by 248 days.

(21) Appl. No.: 11/510,924

(22) Filed: Aug. 28, 2006

(65) Prior Publication Data

US 2008/0051279 A1   Feb. 28, 2008

(51) Int. Cl.
*B01J 29/04* (2006.01)
*F25B 15/00* (2006.01)

(52) U.S. Cl. .................. 502/417; 502/60; 502/64; 62/101; 62/106

(58) Field of Classification Search ................. None
See application file for complete search history.

(56) References Cited

U.S. PATENT DOCUMENTS

2004/0093876 A1 * 5/2004 Inagaki et al. ............ 62/112

* cited by examiner

*Primary Examiner*—Jennifer McNeil
*Assistant Examiner*—James Corno
(74) *Attorney, Agent, or Firm*—Akerman Senterfitt; Gregory A. Nelson; Gregory M. Lefkowitz

(57) ABSTRACT

A monolith comprises a zeolite, a thermally conductive carbon, and a binder. The zeolite is included in the form of beads, pellets, powders and mixtures thereof. The thermally conductive carbon can be carbon nano-fibers, diamond or graphite which provide thermal conductivities in excess of about 100 W/m·K to more than 1,000 W/m·K. A method of preparing a zeolite monolith includes the steps of mixing a zeolite dispersion in an aqueous colloidal silica binder with a dispersion of carbon nano-fibers in water followed by dehydration and curing of the binder is given.

17 Claims, 2 Drawing Sheets (a)            (b)

INCREASED THERMAL CONDUCTIVITY MONOLITHIC ZEOLITE STRUCTURES

STATEMENT REGARDING FEDERALLY SPONSORED RESEARCH OR DEVELOPMENT

The United States Government has rights in this invention pursuant to contract no. DEAC05-00OR22725 between the United States Department of Energy.

CROSS-REFERENCE TO RELATED APPLICATIONS

Not applicable.

FIELD OF THE INVENTION

The present invention relates to high thermal conductivity adsorbent monolithic structures comprising zeolite, thermally conductive carbon, and a binder.

BACKGROUND OF THE INVENTION

The natural mineral zeolite (e.g. porous aluminosilicate) has the property of strongly adsorbing water vapor, incorporating it in its internal crystal lattice, with a significant release of heat. Water can be deabsorbed from zeolites by heating. The absorption process can proceed in a partially evacuated environment where the absorption of the water by the zeolite can be so forceful that the internal pressure of the closed system drops dramatically and causes liquid water in the system to evaporate and cool, even to the point of freezing. This effect can be used to generate a cooling system where water is evaporated from one chamber of the system, cooling that chamber, and absorbing into the zeolite until the zeolite has reached its saturation point. This characteristic of zeolites has been explored for the development of air conditioning systems, particularly for systems where portability is desired. Portable systems can be used for mobile individuals in occupations where they must wear protective clothing in hot environments or for automobiles, where a significant amount of waste heat is available for the removal of water to recover the water absorbing zeolite.

The water adsorption capacity decreases as the temperature rises in a zeolite and limits the performance of a cooling system designed using a zeolite absorber. For systems of this type, a significant effort has been directed at the surface area of the zeolite bed in contact with the outside surface with the goal of increasing the rate of heat loss from the zeolite absorber. Many studies have focused on the design of the bed such that it has more surface area on the outside so that cooling by outside air will be more efficient. Unfortunately, the improvement of the absorption capacity has not been significant. A limitation for such a system is the thermal conductivity of the zeolite bed itself. A conventional packed bed of zeolite beads or powder is very thermally insulating with a room temperature thermal conductivity of about 0.2 to no more than about 10 W/m·K. The heat generation on absorption of water far exceeds heat loss to the environment for the best external architectures. Zeolite beds can reach temperatures of about 120° C. or more while absorbing water at practical rates of absorption for such cooling systems.

Zeolites are often employed as absorbents in air purification systems. Zeolites have been employed with other absorbents to enhance or modify the systems. A commonly employed combination is that of carbon and zeolites, which are considered complimentary absorbents. Usually they are employed in discontinuous layers, but have been used as a mixture of solids. The "absorbent carbon" used in such systems are charcoals and activated carbons formed by the pyrolysis of coal, wood, bark, and other cellulose based materials where volatile materials are remove. These "absorbent carbons" are also thermal insulators with thermal conductivities in the range of 0.5 W/m·K. Therefore, these mixed absorbents cannot significantly improve the water capacity limitations of the zeolites due to the high temperatures achieved by the zeolites during absorption.

There is a need to address absorption limitations due to the heating of the zeolite upon absorption of water. A route to improve the cooling of the zeolite during water absorption is also needed such that cooling and other systems based on the absorption of water in zeolites might be significantly enhanced.

BRIEF DESCRIPTION OF THE DRAWINGS

A fuller understanding of the present invention and the features and benefits thereof will be obtained upon review of the following detailed description together with the accompanying drawings, in which.

SUMMARY OF THE INVENTION

Figure 1:
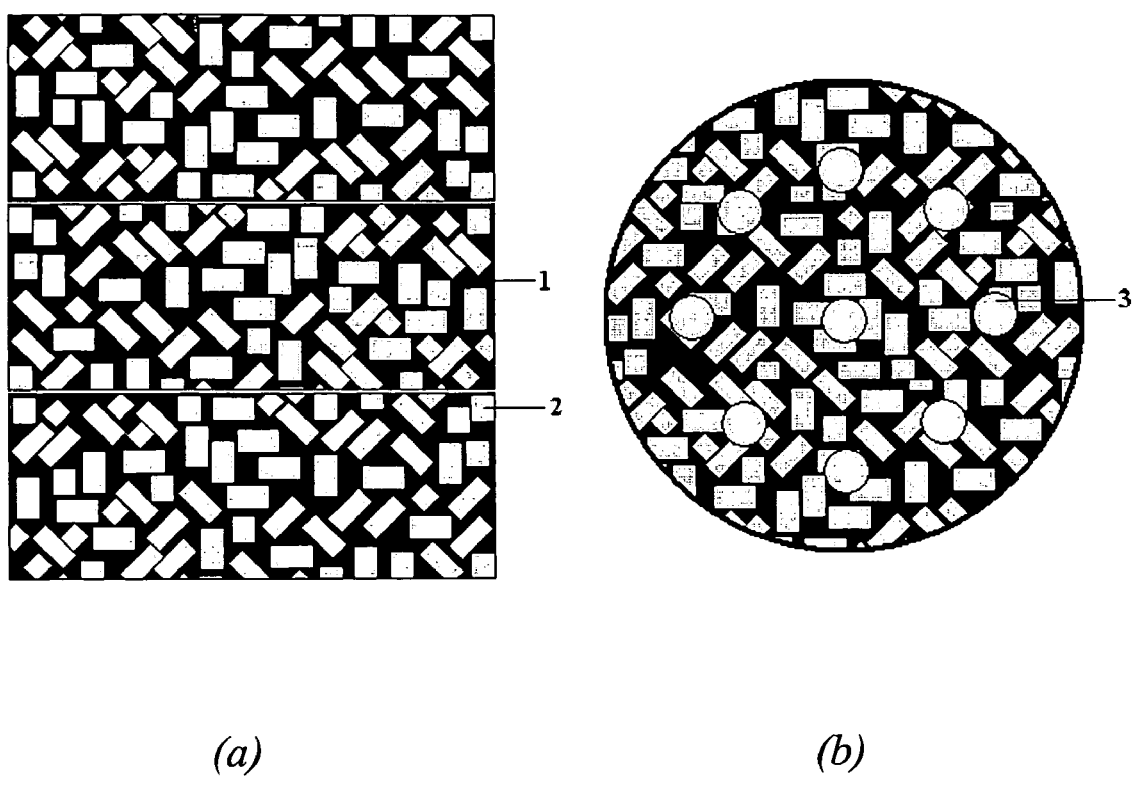
FIG. 1 shows (a) a stack of thermally conductive monolithic zeolite discs of the present invention and (b) the top of a disc machined by drilling a pattern of holes through the disc to promote rapid diffusion of water into the monolith.

A monolith comprises zeolite, thermally conductive carbon, and a binder, wherein the carbon has a room temperature thermal conductivity greater than 100 W/m·K. The zeolite can be in the form of beads, pellets, powders or any mixture of beads, pellets, or powders. The carbon can have a room temperature thermal conductivity of between 200 and 2,500 W/m·K. The carbon can be carbon nano-fibers. The binder can be a ceramic binder. The ceramic binder can be derived from colloidal silica. The carbon can be about 2 to about 40 weight percent of the monolith. The binder can be about 5 to about 20 weight percent of the monolith.

A method of preparing a monolithic article can include the steps of providing a zeolite suspension in a binder or binder precursor in a liquid or solution state, providing a suspension of a thermally conductive carbon in a liquid miscible in the binder liquid or solution, mixing the zeolite suspension with the thermally conductive carbon suspension to form a mixture, filling a mold with the mixture, and removing volatile components from the mixture in the mold; and heating the mold to form the monolithic article. The method can include the step of removing the monolithic article from the mold. The method can include the step of machining the article. The machining can be cutting or drilling. The binder precursor can be colloidal silica. The suspension of thermally conductive carbon can include a dispersing agent.

An evaporative cooling system, comprises a water-containing chamber, a monolith chamber containing a monolith comprising zeolite, thermally conductive carbon, and a binder, and a channel between the water-containing chamber and the monolith chamber. The evaporative cooling system can have a valve between the water containing chamber and the monolith chamber.

DETAILED DESCRIPTION OF THE INVENTION

It has been discovered by the present inventors that zeolites capacity in absorbers can be significantly improved by modifying the thermal properties of the zeolite absorbing medium by the incorporation of thermally conductive carbon. A highly thermally conductive carbon, such as a carbon nanofiber, is combined with a zeolite. It was found that a colloidal silica binder can be used with this mixture to achieve a monolithic structure. This monolithic zeolite-carbon containing structure display highly improved thermal conductivity over that of zeolite alone. As used in this application the term monolith is defined as a single solid entity.++ As a monolith the properties of the zeolite conducting carbon dispersion can remain relatively constant over long periods of use and reuse. This is particularly advantageous when the monolith is used in a portable system where motion and vibration could otherwise modify the size, shape and distribution of the components during use. The monolith is not necessarily a homogeneous composition as the zeolites and thermally conductive carbon need not be uniformly mixed. However, sufficient contact between the thermally conductive carbon and the zeolites is required and is generally achieved by a well dispersed mixture. The increased thermal conductivity improves the heat profile observed while using the monolith to absorb water whereby the resulting maximum temperature is reduced and the absorbents capacity for water is increased. Other liquids that absorb in zeolites can be used as the sorbate in place of water.

The zeolites can be incorporated into the monolith from commercially available zeolite beads, pellets, powders or combinations of these forms. The zeolites can be of any type that readily absorbs water or other liquids sorbate that is volatile under the conditions the monolith is used. A preferred zeolite is a 13X molecular sieve, which can absorb as much as 25% by weight or more water and can be regenerated at 250 to 300° C. Other zeolites that can be used include 3A, 4A and 5A molecular sieves, although their water absorption capacities are generally lower than the capacity of 13X molecular sieves. Different types of zeolites can be combined in the monolith to yield useful compositions.

The thermally conductive carbon can be any thermally conductive form including graphite, diamond, or carbon nano-fibers. Carbon nano-tubes also display high thermal conductivities and can be used in the present invention. A preferred thermally conductive carbon is a carbon nano-fiber. Although many of these forms of carbon display anisotropic thermal conductivities, they are preferably used where there is a random orientation of fibers or particles such that thermal conductivity can be high in all directions. The thermal conductivity that is recited for the carbon for inclusion in the monolith of the invention is the maximum value of thermal conductivity measured for a carbon when the thermal conductivity is anisotropic. Carbon nano-fibers can have room temperature thermal conductivities of approximately 1600 W/m·K, which is greater than natural diamond of approximately 1200 W/m·K, and much greater than that of typical commercially available graphite which range from about 25 to 470 W/m·K, averaging approximately 150 W/m·K. Preferred forms of graphite are pitch-based graphite fibers and highly ordered pyrolytic graphite, which have thermal conductivities of about 320 W/mK to about 1000 W/m·K. Although the thermally conductive carbon can be of any physical form, the form of fibers is preferred. The structure of a fibers enhance the probability of direct physical contact between individual thermally conductive carbon entities and between the thermally conductive carbons and the zeolites as the fibers extend through the monolith. Carbon powders dispersed in a monolith are less likely to have direct and continuous contact with other carbon entities and zeolites in the monolith and can have a lower efficiency of thermal transfer relative to fibers. These forms of carbons can have room temperature thermal conductivities that are significantly higher than metals. For example, the room temperature thermal conductivity of pure silver is approximately 420 W/m·K and that of stainless steel is approximately 15 W/m·K.

The binders or binder precursor is a liquid or is able to be dissolved in a solvent and can cure to a solid from the liquid state or upon removal of the solvent. The binder must be stable under the thermal conditions required to remove the water or other liquid sorbate to regenerate the dry zeolite. The binder is preferably a ceramic binder. The ceramic binder is preferably colloidal silica. The colloidal silica binder yields a uniform solid monolith upon curing and does not degrade upon repeated regenerations to recover the dry monolith.

An additional requirement of a preferred binder is that while binding the other components into a monolith, the binder does not permanently fill the pores of the zeolite or become a diffusion barrier to the pores. Filled or otherwise inaccessible pores restrict water or other sorbate inclusion in the zeolite thereby reducing the rate of absorption and the capacity of the monolith. Colloidal silica can be dissolved in water and comprises silica particles in excess of one nanometer and less than 5 nanometers in diameter that do not become included within the pores of a 13X molecular sieve. A 13X molecular sieve is a zeolite with relatively large pores. The glassy solid binder from colloidal silica is generally very porous.

The proportions of the zeolites, their form and type can be varied over a wide range and can be 50 to 90 percent by weight of the monolith. The proportion of binder can be varied over a wide range and can be 5 to 20 percent by weight of the monolith. In general, the minimal amount of binder necessary to yield a monolith of the desired properties is used.

The proportion of thermally conductive carbon can also be varied and the proportion can be determined empirically to yield the greatest water absorption capacity of the monolith under the desired use conditions. This water absorption capacity of the monolith is defined by the proportions of zeolite and thermally conductive carbon since the capacity depends of the temperature of the zeolite during water absorption as well as the number of absorption sites in the zeolite. The value of the thermal conductivity of the carbon and the form of the carbon also affects the ultimate temperature reached during absorption of water in the monolith. The greater the thermal conductivity of the carbon and the distance to which heat transfer can proceed on a single carbon particle or fiber, the lesser the amount of carbon required to yield a given improvement in the water capacity of the monolith. For any given ratio of zeolite to carbon, the quality of their dispersion will also affect the monoliths ability to transfer the heat from the zeolite and the monoliths water absorption capacity. The thermally conductive carbon is generally 2 to 40 percent by weight and is preferably 5 to 20 percent of the monolith. Levels of carbon below this range decrease the capacity of the monolith to absorb water by insufficiently transferring heat from the monolith and levels of carbon above this range will limit the capacity to absorb water due to the reduction in the quantity of zeolite in a given volume of monolith.

There are a variety of suitable methods for preparing monoliths according to the present invention. For example, zeolite beads and/or powders can be combined with colloidal silica in water. This suspension can then be combined with carbon nano-fibers dispersed in water. After intermixing of the two suspensions and placing the mixture in a mold, the water can be removed by heating or a combination of heating and vacuum to the mold. After the removal of water, heating the binder results in its curing to yield a monolith with a shape defined by the shape of the mold. The mold can be the housing of the apparatus where the monolith is to be used. Alternately, the monolith can be removed from the mold and subsequently placed in an apparatus. The cured monolith can then be machined to further modify the shape and surface area of the monolith. Machining can include cutting or drilling of the monolith.

The dispersion of carbon nano-fibers in water can be prepared with the aid of a dispersing agent. The dispersing agent can be a water miscible surfactant. Non-ionic, anionic, cationic, or zwitterionic surfactants can be used. Many dispersing agents are known for the dispersion of nano-fibers in water and include sodium polystyrene sulfate type, and nonylphenoxypoly(ethyleneoxy)ethanol type dispersing agents. Dispersing agents can be used at levels of 0.01 to 10% by weight of the dispersion. Dispersions can be prepared by any agitation technique including: high shear mixing, such as with a high speed mixer, homogenizers, microfluidizers, a Kady mill, or a colloid mill; high impact mixing, such as attritor, ball or pebble mill; and ultrasonication methods.

The invention can be modified in composition for performance, economic, and other reasons. For example, the monolith can include other thermally conductivity material, such as metals with high thermal conductivity up to about 10% in addition to the thermally conductive carbon. This can be done to improve the cost of the material without dramatically sacrificing the thermal conductivity of the monolith. In the limit thermal conductors other than thermally conductive carbon can be used in a monolith of the invention. However, alternate thermal conductors will generally not afford the desired net thermal conductivity of a monolith with the high zeolite loadings possible with thermally conductive carbons.

A variety of systems can benefit from the increase in thermal conductivity provided by monoliths according to the invention. For example, monolithic compositions according to the invention can be incorporated into systems such as portable evaporative cooling systems. Monoliths according to the invention can also be used in zeolite-based systems to absorb water or other sorbates from gases and liquids.

An evaporative cooling device can be constructed that comprises a cooling chamber containing, for example, water, a chamber containing the conducting carbon zeolite monolith, and a channel through which water vapor can pass between the cooling chamber and the monolith chamber. In general, a valve between the two chambers will be included in the channel to isolate the water in the cooling chamber from the monolith chamber until cooling by the device is desired. The water chamber cools due to the evaporation of the water in that chamber. When the monolith reaches its maximum water content, cooling will stop. Water can be driven back to the cooling chamber by heating the monolith to a sufficiently high temperature. The valve can be used to adjust the rate of cooling. Such a system permits a cooling device that does not require a compressor and a power source to run the compressor.

This feature has many applications in portable systems. An ensemble of these evaporative cooling devices can be used where switching from one device to another permits cooling by one device while one or more equivalent devices are being regenerated. The switching can be performed manually or can be automated using sensors and a controller. Such a system is applicable for motor vehicle air conditioning systems where little or no power is diverted from the motor to run the air conditioning system resulting in an increased average fuel efficiency. When a given device has stopped cooling because the zeolite has become saturated, the heated gas in the vehicle's engine exhaust can be diverted to a jacket around the zeolite chamber to heat the chamber and drive the water from the zeolite to the cooling chamber and restore the device to a state capable of evaporative cooling. Hence the monolith can permit a more efficient utilization and conservation of energy resources.

The invention will be illustrated by the following non-limiting example. Other embodiments of the invention will be apparent to those skilled in the art.

EXAMPLE 1

Zeolite 13X beads were mixed with zeolite 13X powder to yield approximately 60% by mass beads. The mixed zeolites were then mixed with an equal mass of a 20% colloidal silica in water solution. Carbon nanofibers, PYROGRAF®-II, was dispersed in water with the aid of the dispersant DISPERS-AYD® and ball milled for 24 hours. Approximately 10% by weight of carbon nanofibers to mass of solids was added to the suspension of zeolite and colloidal silica. This mixture was blended until it appeared to be a relatively homogeneous mixture of zeolite and carbon and then poured into a mold made from 100-mesh stainless steel screen. The molded mixture was allowed to dry overnight at 50° C. and was subsequently cured for 4 hours at 300° C. The part was a solid monolith disk after removal from the stainless steel screen mold. A stack of such monolith disks are shown in FIG. 1(a) with zeolite beads 2 dispersed within a phase of carbon nanofibers and zeolite powder 1. The molded monolith can be machined into a shape desirable for adsorption, as illustrated by the large holes 3 displayed in FIG. 1(b) which provide large pathways for vapor access to the interior of the monolith disc.

EXAMPLE 2

Figure 2:
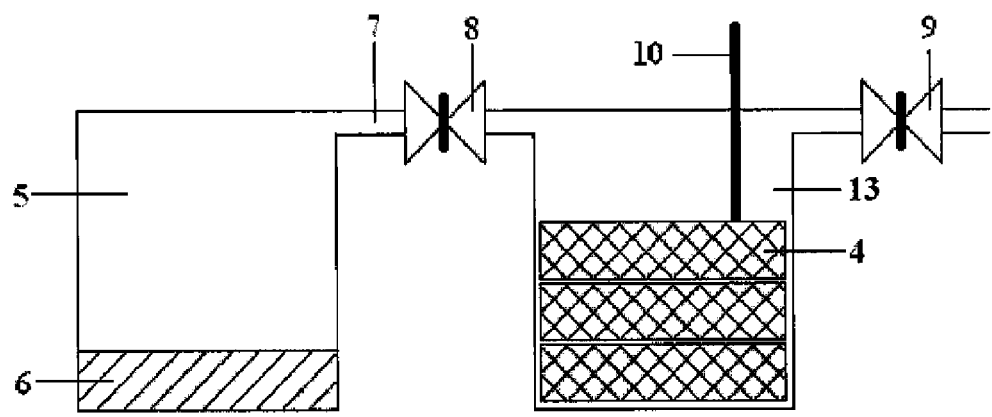
FIG. 2 shows an evaporative cooling system including a water-containing chamber in communication with a chamber for a zeolite monolith.

Zeolite monolith disks 4 were placed in a subscale test system's zeolite chamber 13 schematically shown in FIG. 2. Water 6 was added to second chamber 5 that was partially evacuated and placed in a condition of isolation with the zeolite chamber 13 by closing a master valve 8 that resides in a channel between the two chambers to permit vapor transport between the two chambers. With the master valve 8 closed, the zeolite chamber 13 was heated to 300° C. under vacuum through evacuation valve 9 to dry the zeolite of all water and remove all non-condensable permanent gasses.

The test system was then sealed under vacuum by closing valve 9. The master valve 8 was then opened between the two chambers 13 and 5. The temperature of the zeolite monolith was monitored via a thermocouple 10 inserted into the zeolite chamber 13. The maximum temperature in the zeolite chamber 13 upon absorption of water was only 70° C. The temperature change was 50° C. less than that for chamber 13 packed with 13X zeolite beads, where the temperature reached 120° C. This large decrease in maximum temperature upon water absorption permits a significant increase of the water capacity of the zeolites in such a cooling system.

It is to be understood that while the invention has been described in conjunction with the preferred specific embodiments thereof, that the foregoing description as well as the examples, which followed are intended to illustrate and not limit the scope of the invention. Other aspects, advantages and modifications within the scope of the invention will be apparent to those skilled in the art to which the invention pertains.

We claim:

1. A monolith, comprising:
   zeolite, thermally conductive material, and a binder, wherein said material has a room temperature thermal conductivity greater than 100 W/m·K.

2. The monolith of claim 1, wherein said zeolite is in the form of beads, pellets, powders or any mixture of beads, pellets, or powders.

3. The monolith of claim 1, wherein said material is carbon.

4. The monolith of claim 3, wherein said carbon has a room temperature thermal conductivity of between 200 and 2,500 W/m·K.

5. The monolith of claim 3, wherein said carbon comprises carbon nano-fibers.

6. The monolith of claim 3, wherein said carbon comprises about 2 to about 40 weight percent of said monolith.

7. The monolith of claim 1, wherein said binder comprises a ceramic binder.

8. The monolith of claim 7, wherein said ceramic binder is derived from colloidal silica.

9. The monolith of claim 1, wherein said binder comprises about 5 to about 20 weight percent of said monolith.

10. A method of preparing the monolith of claim 1, comprising the steps of:
    providing a zeolite suspension in a binder or binder precursor in a liquid or solution state;
    providing a suspension of a thermally conductive carbon in a liquid miscible in said binder liquid or solution;
    mixing said zeolite suspension with said thermally conductive carbon suspension to form a mixture;
    filling a mold with said mixture;
    removing volatile components from said mixture in said mold; and
    heating said mold to form a monolith article.

11. The method of claim 10, further comprising the step of removing said monolithic article from said mold.

12. The method of claim 10, further comprising the step of machining said article.

13. The method of claim 12, wherein said machining comprises cutting or drilling.

14. The method of claim 10, wherein said binder precursor comprises colloidal silica.

15. The method of claim 10, wherein said suspension of thermally conductive carbon includes a dispersing agent.

16. An evaporative cooling system, comprising:
    a water-containing chamber;
    a monolith chamber containing the monolith claim 1, and
    a vapor transport channel connecting said water-containing chamber and said monolith chamber.

17. The evaporative cooling system of claim 16, further comprising a valve in said channel.

* * * * *